(12) United States Patent
Hollander (10) Patent No.: US 7,710,553 B2
(45) Date of Patent: May 4, 2010

(54) IMAGING OPTICAL ENCODER

(76) Inventor: Samuel Hollander, 7591 Orchard Hammock Dr., West Palm Beach, FL (US) 33412

( * ) Notice: Subject to any disclaimer, the term of this patent is extended or adjusted under 35 U.S.C. 154(b) by 0 days.

(21) Appl. No.: 11/813,921

(22) PCT Filed: Jan. 17, 2006

(86) PCT No.: PCT/US2006/001471

§ 371 (c)(1),
(2), (4) Date: Aug. 16, 2007

(87) PCT Pub. No.: WO2006/107363

PCT Pub. Date: Oct. 12, 2006

(65) Prior Publication Data

US 2008/0117414 A1 May 22, 2008

Related U.S. Application Data

(60) Provisional application No. 60/666,427, filed on Mar. 30, 2005, provisional application No. 60/685,648, filed on May 27, 2005, provisional application No. 60/711,894, filed on Aug. 26, 2005.

(51) Int. Cl.
*G01B 11/26* (2006.01)
(52) U.S. Cl. ................................... 356/141.1
(58) Field of Classification Search ....... 356/3.01–28.5, 356/139.01–139.1
See application file for complete search history.

(56) References Cited

U.S. PATENT DOCUMENTS

| | | | |
|---|---|---|---|
| 4,442,606 A * | 4/1984 | Graham et al. ................ 33/1 N |
| 4,647,769 A | 3/1987 | Stone et al. |
| 4,688,088 A * | 8/1987 | Hamazaki et al. ............. 348/94 |
| 4,945,231 A | 7/1990 | Ohya et al. |
| 5,665,965 A * | 9/1997 | Durham, III ........... 250/231.13 |
| 5,894,678 A * | 4/1999 | Masreliez et al. ............. 33/762 |
| 6,660,997 B2 | 12/2003 | Laberge et al. |
| 6,741,343 B2 * | 5/2004 | Shafer et al. ................ 356/247 |
| 2005/0133705 A1 * | 6/2005 | Hare et al. ............. 250/231.13 |

OTHER PUBLICATIONS

Written Opinion, dated Jun. 26, 2006, issued in the corresponding PCT application PCT/US2006/001471 filed on Jan. 17, 2006.
Relevant portion of International Search Report, dated Jun. 26, 2006, issued in the corresponding PCT application PCT/US2006/001471 filed on Jan. 17, 2006.
International Preliminary Report on Patentability issued in PCT/US2006/001471, mailed Oct. 11, 2007.
Written Opinion issued in PCT/US2006/001471, mailed on Jun. 6, 2006.

* cited by examiner

*Primary Examiner*—Thomas H Tarcza
*Assistant Examiner*—Luke D Ratcliffe (57) ABSTRACT

A device provides precise determination of angle or position based upon linear array imaging of unique coded sequences imprinted on a reference wheel or linear scale. An optical image of coded reference marks thus obtained is digitally processed to identify the width and centroid location of lines within a sequence, from which precise angle or position can be derived. The device provides either absolute or relative angle or position measurements that may be used for reference, control, monitoring, or display. The code sequence, imprinted on the exterior cylindrical edge of a code wheel or on the face of a code strip, is subdivided into unique coded segments. The coded segments and imaging array are sized such that the array is always able to image a full contiguous segment for any angular or linear position.

5 Claims, 11 Drawing Sheets

IMAGING OPTICAL ENCODER

CROSS-REFERENCE TO RELATED APPLICATIONS

This application is a U.S. National Phase Application of PCT International Application PCT/U.S. 06/01471 filed Jan. 17, 2006 and claims priority from U.S. Provisional Patent Application Ser. Nos.: 60/666,427 filed Mar. 30, 2005; 60/685,648 filed May 27, 2005; and 60/711,894 filed Aug. 26, 2005, the contents of which are incorporated herein by reference.

BACKGROUND OF THE INVENTION

The invention relates to a new and improved miniature sensor for the precise measurement and digital encoding of both absolute and relative values of angle or position combined in a single instrument. More particularly, the invention relates to precise angle and position determination using an imaging array and frontal illumination to observe, interpret, and calibrate coded markings on the cylindrical edge of a reference wheel or on a planer face of a linear strip.

Digital encoders convert position or motion into a sequence of digital pulses and are used in a wide variety of control and measurement applications. Incremental encoders keep track of accumulated pulse count to provide a direct measure of motion relative to their initial state. Absolute encoders interpret a given reading, converting it directly to position without the need to retain prior pulse history. Encoders are generally designed specifically for either angle or position measurement, and operate using either field or optical sensing techniques.

Field sensing devices include magnetic encoders as well as resolvers, synchros, inductosyns, and linear variable differential transformers. Magnetic encoders sense motion of a polarized magnet or that of small uniformly spaced magnetic dipoles encoded on a reference scale. The other devices have current carrying coils on their rotor or slider as well as the stator, thus requiring electrification on both sides. Memory is generally required to make a magnetic encoder appear to function as an absolute encoder, along with additional electronics for analog to digital conversion and linearity control. Except for the dipole counter, which is non-absolute, the presence of coils or magnets on the moving side limits the opportunity for significant miniaturization.

Optical encoders are inherently digital, processing light rays passing through or reflected from a coded scale and sensed by one or more photodetectors. The most common type of optical rotary encoder (U.S. Pat. No. 4,945,231) consists of a light source, a coded disk pivoted in a precision ball bearing, and an array of discrete photocells. A light emitting diode (LED) shines through the code disc, having alternate annular segments of transparency and opacity. These coded segments interrupt the light beam creating light pulses that are detected by the photocells. To achieve precision, the segments are laid out on an elaborate code wheel in several concentric tracks. A 10 track encoder is capable of producing $2^{10}$ or 1024 distinct positions, equivalent to an angular resolution of 0.351 degrees (360/1024).

Greater accuracies, of 14 bits and higher, are available but require a larger diameter code wheel to accommodate additional tracks, or alternatively a finer grating resolution and/or alternate process that can significantly impact the cost of manufacturing. Such inherent limitations present significant obstacles for newer applications where size and cost are critical factors.

In view of the above, it would be desirable to achieve miniaturization in an absolute rotary encoder, with resolution equivalent to or better than that of somewhat larger diameter conventional encoders. It would be further desirable to incorporate internal self-calibrating features into the design, thus enabling some relaxation of the normally high tolerances associated with manufacture and assembly of the product, so as to minimize its cost of production. Still further, it would be desirable to provide the ability to perform both angle and linear position computations using the same apparatus without requiring modification to its internal electronics, or operating software.

SUMMARY OF THE INVENTION

In accordance with a preferred embodiment of the invention, an imaging encoder apparatus is provided that includes; a sensor head, an electronics module, and specially prepared coded reference sequences. The sensor head comprises an illumination source, typically an LED, and a detector, for example a linear photodiode array to image a segment of the code, and the optics necessary to focus code onto the imaging plane of the array. The linear array reads the code, converting the image into a digital word consisting of strings of 0's and 1's, corresponding to the widths of the code lines and the spaces between them. The electronics module contains components and software for processing this digital array word, determining the location of the centroids of individual reference markings in the image. By processing these centroid locations with respect to each other and with respect to the sensor's imaging axis, angle or position of the object upon which the code is placed can be derived from the system's physical geometry.

The coded reference sequence is comprised of equal code divisions whose span is of a dimension such as to guarantee that the linear photodiode array will always image a continuous code division, irrespective of the position of the reference object to which said coded sequence is attached. Code divisions are defined by recognizable edge marks of specified width, and are distinguished from one another by the phasing of an interior identification mark having a different line width than said edge marks. The code sequence is then interpreted in accordance with rules, pre-stored in internal software, associated with a specific sequence number as revealed in the first division of a code sequence or the start of a new sequence.

In a preferred embodiment, a code is imprinted or otherwise affixed on the cylindrical edge of a reference code wheel in the Imaging Angle Encoder (IAE) configuration of the present invention. Precise fine line code in very narrow segments can be generated for this purpose using microlithography techniques. Such code can be read by a linear array, comprised of a short length string of photodiodes, to a resolution of just a few µm. This enables the diameter of the code wheel to be reduced to a size substantially less than wheels used in the prior art. The present invention derives this size advantage by eliminating the need to employ either dense multi-track coding patterns as used in conventional optical encoders or rotor side field generating components as used in conventional magnetic encoders, each of which tend to limit the ability to reduce the diameter of a rotary encoder.

The present invention preferably employs the exceptional resolution embodied within the linear photodiode array, along with knowledge of the physical properties and geometry of the apparatus to develop internal software algorithms and procedures for calibrating major system errors. The software contains modules for both recognizing and ignoring inactive (dead) pixels in the array, as well as a module to compensate for image distortion produced by an imperfect lens and/or internal alignment errors. This latter function uses correction coefficients obtained through an automated factory sequence in which a prior calibrated reference standard is imaged. Also featured is an internal calibration routine to compute the precise location of individual code markings to correct for reference code imperfections. An additional feature of the calibration software is its ability to determine through successive measurements the diameter of the code wheel being used. This, combined with the ability to correct for small errors in the code pattern, relaxes manufacturing tolerances on the code wheel and also allows the sensor to be used with different sized wheels.

The software is preferably adapted to recognize and process coded reference sequences suitable to either rotary angle or linear position measurement. Both functions are accomplished within a common logical framework, with position sensing being a special case of angle sensing in which the reference wheel has an infinitely large diameter. The invention is thus capable of functioning as an Imaging Position Encoder (IPE) without modification to the sensor head or electronics module. In this alternate configuration the wheel is replaced with a similarly coded planar strip with a code that is able to accommodate an open ended linear measurement range. The functional configuration is selectable through internal software that accommodates the change in geometry providing an output formatted in the most appropriate units. This dual use capability combined with the suitability to miniaturization offers substantial benefits over current state-of-the-art devices.

Absolute angle or position information is available at system turn on, without special encoder preparation after a one time initial setup, and relative displacement from a selected reference point can be obtained by first storing the angle or position from which displacement is to be measured.

In one alternate embodiment of the invention, the encoder is modified to also provide a measure of low levels of angular rate or linear speed. This is accomplished by adding a timing reference and the additional circuitry required to sample successive measurements and divide by the time interval between the two readings. The basic rate measurement capability in this embodiment is a function of several factors including: array pixel width, intensity of illumination, image collection time, and speed of processing. Other embodiments operate in a similar manner as the preferred embodiment but may use alternate optics to reduce system cost, or may incorporate multiple line arrays, illumination sources, and other components for increased system reliability.

Additional features and advantages of the invention will become apparent to those skilled in the art from the following detailed description of the preferred embodiments.

BRIEF DESCRIPTION OF THE DRAWINGS

The invention is illustrated in the accompanying drawings, in which like reference numerals are used to denote like similar parts, and wherein:

FIG. 11 is an exploded view of an apparatus incorporating the present invention and a digital readout that functions as an electronic clinometer, while

FIG. 12 is an exploded view of an apparatus incorporating the present invention and a digital readout that functions as an electronic protractor and dimensioning instrument, while

FIG. 13 is an exploded view of an apparatus incorporating the present invention and a digital readout that functions as an electronic tape measure, while FIG. 13A illustrates the assembled apparatus.

DETAILED DESCRIPTION OF THE PREFERRED EMBODIMENTS

Figure 1:
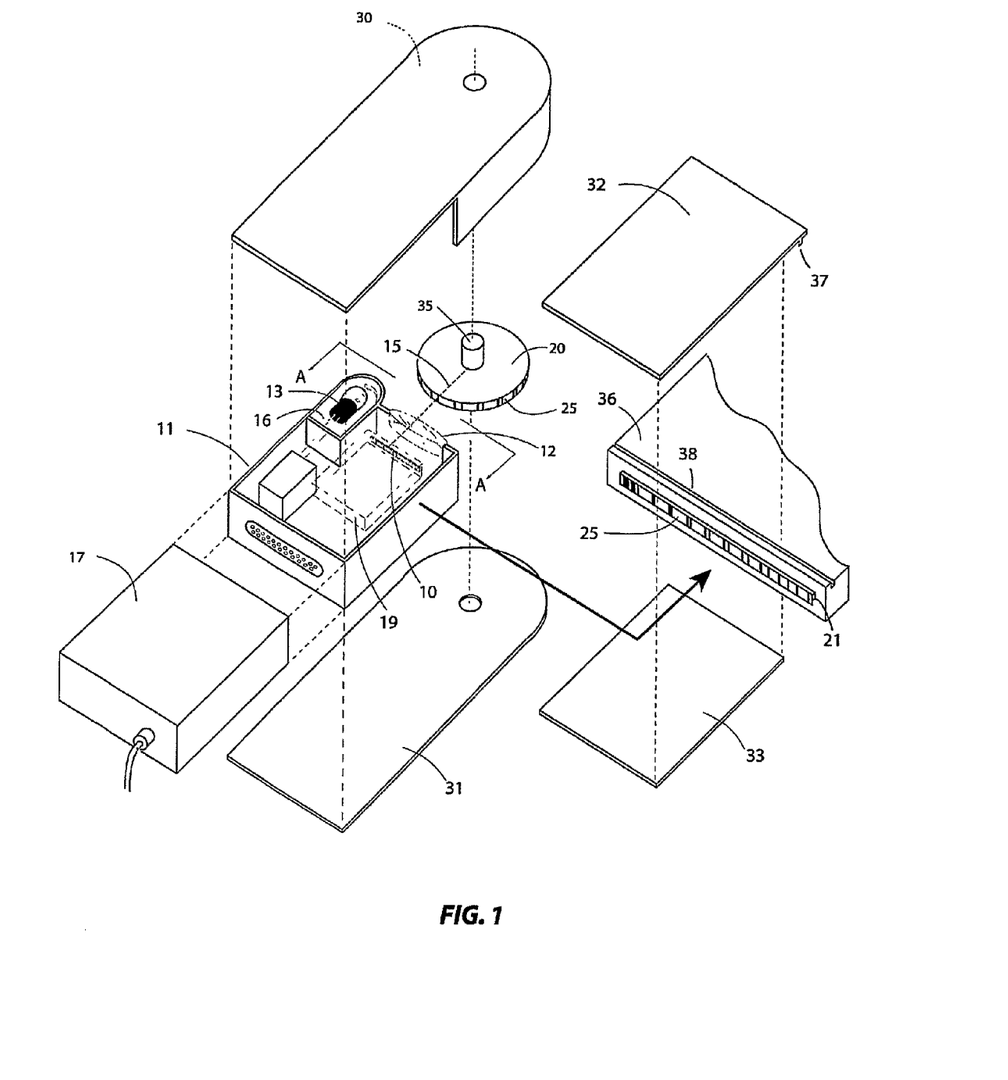
FIG. 1 is an exploded view of the imaging encoder configured for either angle or position measurement.

Referring to FIG. 1, there is shown an exploded view of one specific illustrative embodiment of a dual function imaging encoder constructed in accordance with the principles of the present invention for measuring separately the angular rotation of a shaft 35 or the linear motion of the encoder with respect to a second body 36. The encoder is preferably coupled to the shaft or reference body in a manner to permit free motion within the range for which said motion is to be measured.

To measure angular motion, in just one illustrated example, the encoder is positioned to view a reference consisting of a code wheel 20 that is rigidly secured to the shaft 35 whose motion is to be monitored. The outer cylindrical edge of the wheel is imprinted or otherwise affixed with a specialized code 25 adapted to the invention. The circumferential code is divided into a number of divisions, each of which contains unique information enabling its identification. For large systems, in which said shaft may be in the form of a hollow shaft or drum, the reference code may be imprinted or otherwise affixed to the interior or exterior cylindrical edge. To measure linear motion, the encoder is positioned to view a reference code 25 imprinted or otherwise affixed to a flat surface of a table or other such body 36, relative to which linear motion is to be measured.

Figure 2:
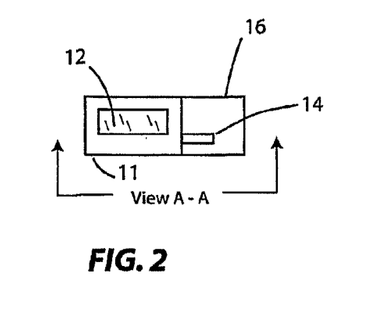
FIG. 2 is a frontal view of the sensor head.

The primary components of an imaging encoder system consist of the reference code 25, a sensor head 11, and an electronics module 17. Included are a suitable housing, mounting method, and means of communicating with the system for set up and initialization, as well as for receiving measurements and status information. The system may be supplied with external power or designed for use with internal batteries. The sensor head 11 consists of a linear imaging array 10 preferably comprised of a plurality of discrete in-line photodetector elements, a lens 12, an illumination source 13, and appropriate electrical circuitry, interconnect wires, and connectors to support operation. The sensor head 11, of which a frontal view (A-A) is shown in FIG. 2, provides the mechanical structure to hold the imaging array 10 in position, aligning the lens 12 and illumination source 13 to view the nearest segments of the code wheel 20 or codestrip 21.

For angular measurements, a linear photodiode imaging array 10 is positioned with respect to a coded reference wheel 20 such that its plane is tangent to an outer circle concentric to the wheel at a predetermined radial distance. For linear displacement measurements the array is held an equivalent distance in front of a linear code strip 21. The size of the code divisions, number of pixels in the array 10, and pixel size are such to assure that the array 10 is able to image in its entirety at least one contiguous division within the code sequence, at the required resolution for any shaft 35 or table 36 position.

In this arrangement, the longitudinal axis of the array is held perpendicular to the system reference axis 15, which for angular measurement is defined as the perpendicular to the linear array 10 passing through the wheel's axis of revolution that either intercepts or is reflected onto the array. For linear displacement measurements, the system reference axis 15 is defined as the axis emanating from the linear array 10 at its center pixel(s) that either intercepts or reflects perpendicularly onto the linear scale 21. For angle measurement, the center pixels of the array 10 are located close to the system reference axis 15, but the precise system reference axis 15 location is determined by internal logic within the encoder.

In the preferred embodiment illustrated in FIG. 1, the line of photodetector elements view the sequence along its proscribed direction of motion from the narrow edge of the microcircuit board 19 that processes the linear array 10 readings. This allows for the width of the encoder apparatus to be held approximately to the size of the detector array, which can be quite small, although side illumination of the code as shown in FIG. 1 will increase the dimension somewhat. This arrangement, used for the purpose of miniaturization, requires the detector elements be formed separately and then electrically connected to its processing circuitry 19. Edge bonded array elements have been previously manufactured, and is the method of preference here, although other arrangements using discrete components to construct the array 10 may also be employed. Alternate optical configurations that reorient the array 10 and/or lens 12 can also be employed without changing the fundamental operation of the present invention. In one alternate embodiment of the encoder, shown in FIG. 3, the photodiode array 10 lies within the plane of its microcircuit 19, employing a mirrored flat 18 to reflect the imaged code viewed by the lens 12.

The lens 12 is required to refract light rays emanating from a given point of the diffusely lit code wheel onto a single pixel of the array 10 so as to produce a faithful image of the coded information. The lens 12 is preferably a thin double convex lens which requires a calibration procedure to determine coefficient values for special algorithms needed to accurately map the observed segment of the cylindrical code wheel 20 onto the linear array 10. Errors due to lens misalignment plus the radial distortion contribution due to imperfect lens production may be compensated by imaging a reference standard with accurately measured line markings and recording these measurements in the encoder processor during factory calibration. Such techniques are similar to those used for camera calibration and are currently considered to be state of the art.

The illumination source 13 is preferably an LED, although light transmitted by fiber optic cable may be appropriate for multiple closely grouped encoders. Additionally, an external light source may also be suitable for certain applications. Light of suitable color and intensity is projected through a small slit 14 in the sensor head onto the segment of the code wheel edge that is currently being viewed by the array 10. The illumination slit 14 is cut into the wall of the illumination chamber 16. The slit 14 is formed by a plane having a thickness sufficient to illuminate the portion of the code sequence being imaged, and inclined somewhat to avoid direct reflection or glare back into the imaging array 10. The inner wall of the illumination chamber 16 is preferably silvered to increase useable light, and may also have vents to prevent damage to the light source itself due to heat generation.

The electronics module 17 attaches directly to the sensor head 11 and is almost entirely microprocessor based, with components selected based upon data processing and software code requirements using state of the art design practices. It provides for complete angle or position determination through the processing and interpretation of the imaging array 10 digital output. The electronics module may display current angle or position determination directly or may provide an electrical signal for control or monitoring by a separate device. Alternatively, this module may be as simple as an electrical interface connector providing power in and data signal output for processing at a remote site. In fact all of the encoder processing functions may be performed in an external central processor belonging to a host system, using software routines developed for the present invention.

The encoder system is supplied with a housing, appropriate to the measurement function that protects the code reference 20, 21 against contamination and the environment and attaches to the sensor head 11. For angle measurement, this housing is in the form of cover sections 30, 31 as drawn in FIG. 1 to completely enshroud the code wheel 20 and protect the code 25, lens 12 (and mirror 18) from dirt and moisture that can impede the imaging process. The encoder housing 30 is rigidly secured to the motor or other stable base, and may be completely sealed if conditions require it. Corresponding cover plates 32 and 33, used for linear position encoding, function in a more limited way but may include enhancements that brush or wipe particles from the codestrip 21. The housing is either part of or attached to the mounting and alignment guide for holding the sensor head 11 in place, and maintaining the required system geometry for position determination. This is accomplished in one exemplary arrangement shown in FIG. 1 with the aid of a guide 37 either attached to or built into the upper cover plate 32 which slides in a channel 38 that is built into or otherwise attached to the reference table 36.

Figure 4:
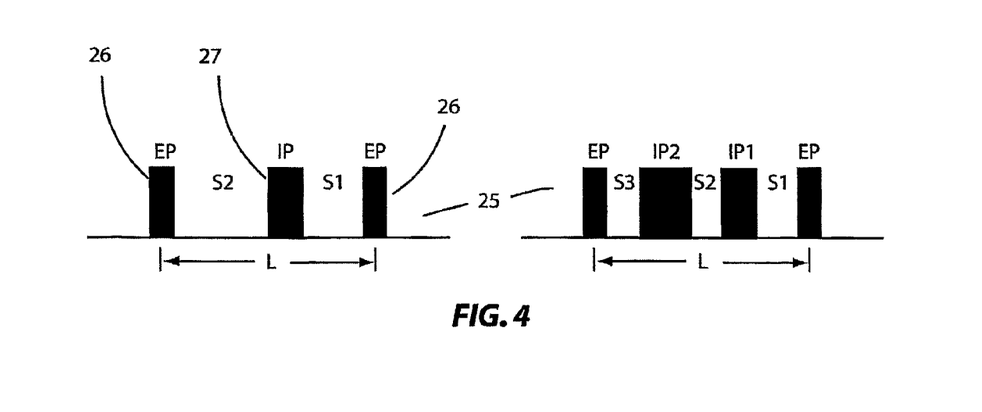
FIG. 4 shows the basic code structure, used for either angle or position measurement.

FIG. 4 shows an exemplary arrangement of the elements of the code sequence 25 embodied in the present invention. The code sequence is subdivided into equal segments of length L, whose ends are defined by edge marks 26, or edge pulses, denoted by EP in FIG. 4. The subdivision in general has an interior mark 27 or indicator pulse IP, distinguished by a line width different from the line widths of the edge marks 26, whose position between the bounding adjacent edge marks 26 can be used to indicate a unique coded subdivision when imaged by the linear array 10. An exception is allowed, generally in the first segment of a new code sequence that uses two indicator pulses 27 to introduce a new sequence and also indicate the polarity or direction of motion. Reference marks 26, 27 inscribed on the code sequence 25 having a width w will be reflected onto the imaging array 10 as a pulse of w/p pixels in width. With w on the order of a millimeter and p a few μm, the encoder apparatus offers substantial resolution for most practical applications.

Segment identification is contained within edge marks 26, in the width and interior phase of the indicator pulse 27, in accordance with predefined rules associated with a specific code sequence number. The code sequence number is determinable from the widths of the double indicator pulses contained in the first division of a new sequence. Code patterns 25 for small diameter codewheels typically use a small number of subdivisions or segments to encode the circumferential path, as will be discussed in some detail subsequently. Larger wheels and open ended linear scales generally require multiple code sequences 25 to ensure unique segments for their entire paths in order to allow absolute measurement at turn on. Such sequences of the form depicted in FIG. 4 can also be developed, consistent with current microlithography and linear array resolutions, which run several hundred divisions in length.

Variations of the basic code sequence 25 include varying segment size L within a coded sequence, or increasing the number of interior indicator lines 27, both comprising techniques which may be used for information transfer and unique segment identification. Additionally, code sequences can be developed having no interior indicator marks 27 but instead convey segment identification through unique combinations of edge mark 26 widths and segment span L. All such code sequences whereby angular or positional information may be derived through the imaging of a set of alternating dark lines separated by light spaces, or vice-versa, and the subsequent measurement of the widths of said marks and said spaces using a linear array, followed by the manipulation and processing of the centroid locations of said lines together with the sizes of the intervening spaces are covered by this invention.

Figure 5:
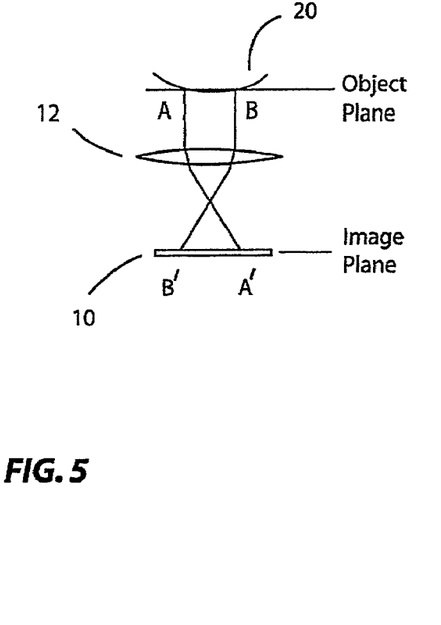
FIG. 5 is a representative code sequence to be placed on the edge of a code wheel, and used by the invention for angle measurement.

FIG. 5 shows an exemplary code sequence 25 to be applied to the circumferential edge of a codewheel 20 to be used by the present invention for angle measurement. The code sequence is shown in (A) as it appears on the codewheel and again in (B) as it appears to the imaging array 10. This reversal is shown in FIG. 5 as the image A-B in the object plane passes through the lens 12 appearing as A'-B' to the array 10. Complete circumferential code sequences for successively smaller wheels, as they appear in the image plane, are included in (C) and (D) of FIG. 5, along with a gage comprised of 20 one-degree wide markings below each code pattern for visual reference.

In the examples shown in FIG. 5, the wheel code is divided into 18 sectors or divisions, each of 20° in size for a total of 360° in circumference. Each sector in the exemplary codewheel 20 is defined by a pair of 1.0 degree wide edge marks. The interior indicator lines used in sectors 2 through 18 are each 1.5° in width, and are positioned in the sector so as to identify the sector uniquely. Sector 1 (0° to 20°) is unique, in that it contains two prominent indicators, 6° and 3° in width in this example. These marks enable the processor to identify the specific code sequence, in this case 63, as well as track total turns. The direction of increasing code angle is determined by noting the direction of increasing indicator pulses within sector 1.

Figure 6:
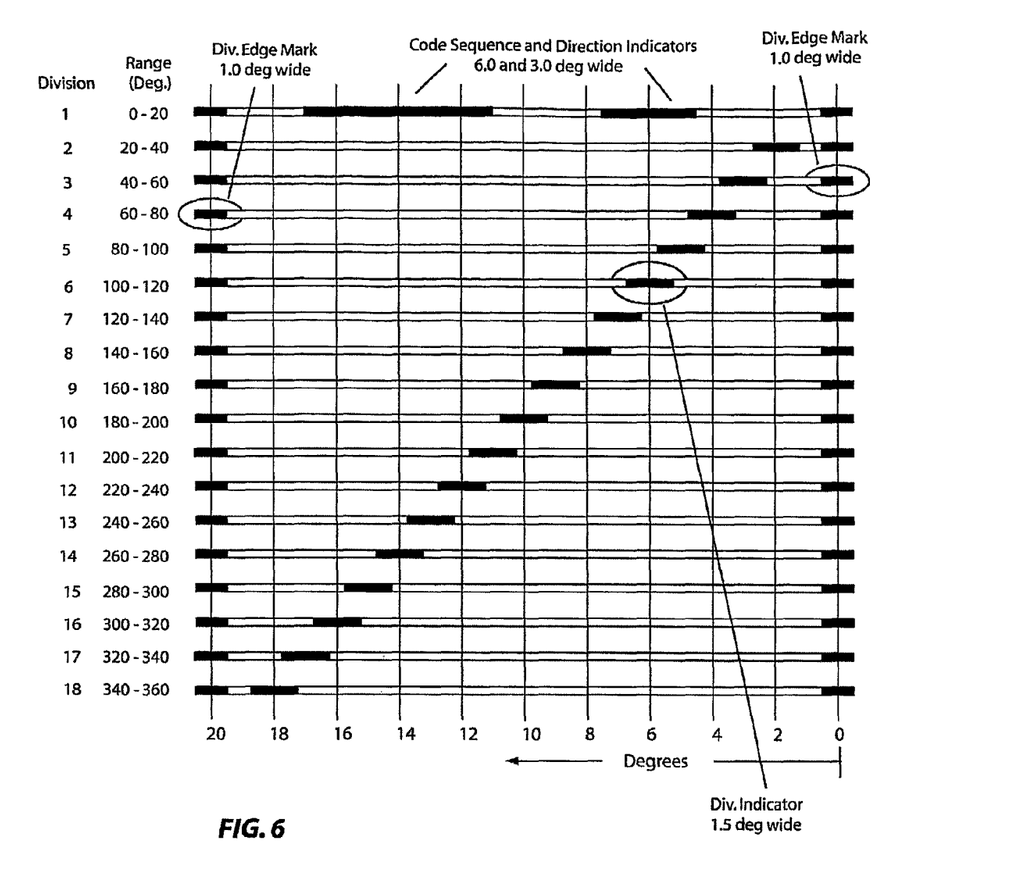
FIG. 6 shows how to read a code wheel, suitable to the present invention, to identify a specific angular segment.

FIG. 6 shows an enlargement of an exemplary 18 sector code wheel pattern as reflected onto the image plane, indicating how each division can be uniquely identified from observable line widths and their relative position or phasing. In sector 2 (20° to 40°) the indicator marker is at 22°, in sector 3 (40° to 60°) at 43°, in sector 4 (60° to 80°) at 64°, and so on.

Figure 7:
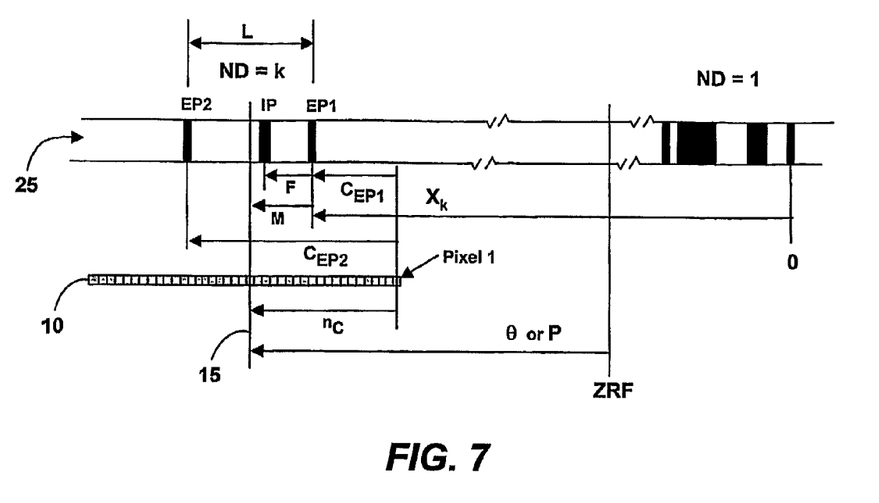
FIG. 7 shows the geometrical relationship between the active linear array, the code sequence being imaged, and the mathematical terms involved in angle or position determination.

FIG. 7 shows the geometric relationship between the linear imaging array 10 and the coded reference sequence 25 as reflected into the image plane, along with key parameters used by the encoder in its determination of angle or position.

As shown, the imaging array 10 views a complete contiguous code division, denoted by division identifier ND=k, along with parts of the adjacent divisions, ND=k+1, k−1. This array must be long enough to image two full divisions in order to guarantee a contiguous division is present for any position relative to the codewheel or codestrip. Assuming a codewheel of diameter D subdivided into N segments, or a linear scale with equal divisions of length L, then an imaging array 10, consisting of n active pixels of pitch p (width) and comprising an active dimension b, must satisfy the minimum array length requirements;

$$b = np \geq 2L \text{ or } b = np \geq D \sin(360°/N) \quad (1)$$

for linear scale and codewheel measurements, respectively.

Referring again to FIG. 7, the encoder system reference axis 15, from which all encoder measurements are referenced, is defined by the normal to the linear array and located a length $n_c$ from the rightmost active pixel, or pixel no. 1. This length and those that follow are typically expressed in equivalent pixels, with conversion to common units reserved until output display. The value of $n_c$ is set as n/2 for linear position determination setting the system reference axis 15 at the center pixel(s) along the linear array 10. In the case of angle measurement, it is desirable to set the reference axis 15 normal to the array 10 but also passing through the axis of rotation of the codewheel. In this case the encoder solves for the value of no by noting the pixel position of the center of a code division when its subtended chord length is a maximum and therefore parallel to the array 10. The solution has the form;

$$n_C = [(C'_{EP2} + C'_{EP1})/2] \quad (2)$$

where $C'_{EP1}$ and $C'_{EP2}$ are the locations of the centroids of the bounding edge marks for the division being imaged. The calibration software keeps track of the maximum chord length it has processed and performs an updated computation of $n_c$ whenever a new maximum is detected.

Both position P and angle θ are computed with respect to the zero origin of the code sequence 25 which is defined as the location of the first edge mark in the first division, ND=1, reserved for sequence identification. The encoder may also compute angular or linear displacement relative to some other point in the code sequence 25 by setting a new zero reference position ZRF as indicated in FIG. 7. The output measurement is the accumulated length $X_k$ of the preceding divisions up to ND=k, plus the distance M between the system reference axis and the centroid of the first edge mark in the kth division, minus the offset between the zero origin of the code sequence and the zero reference position ZRF. The expressions for computed angle or position have the form;

$$\theta = \Sigma L_k' + a\tan[2(n_C - C'_{EP1})/D] - ZRF$$

$$P = \Sigma L_k' + (n/2 - C'_{EP1}) - ZRF \quad (3)$$

respectively, where $L'_k$ is the width of the kth division, and $C'_{EP1}$ is the centroid of the first edge mark with respect to the first pixel of the active linear array 10. A prime indicates that the value has been corrected using the encoder's internal calibration procedures. A nominal value for the diameter D of the code wheel is inserted at the factory, but is refined internally once all division chords $L_k$ have been measured and summed. The calibrated value for D is;

$$D' = \frac{\sum_{k=1}^{N} L'_k}{N \cdot \sin(\pi/N)} \qquad (4)$$

where N is the total number of code segments around the codewheel 20. The numerator in the above equation represents the perimeter of an N sided regular polygon, whose total length is proportional to the diameter of the codewheel. As N increases, the proportionality factor approaches the quantity π. If the wrong value of D is used in the initialization process, or the size of the codewheel is subsequently changed, the sensor logic will recognize this through its internal calibration sequence and compensate for this change automatically.

Figure 8:
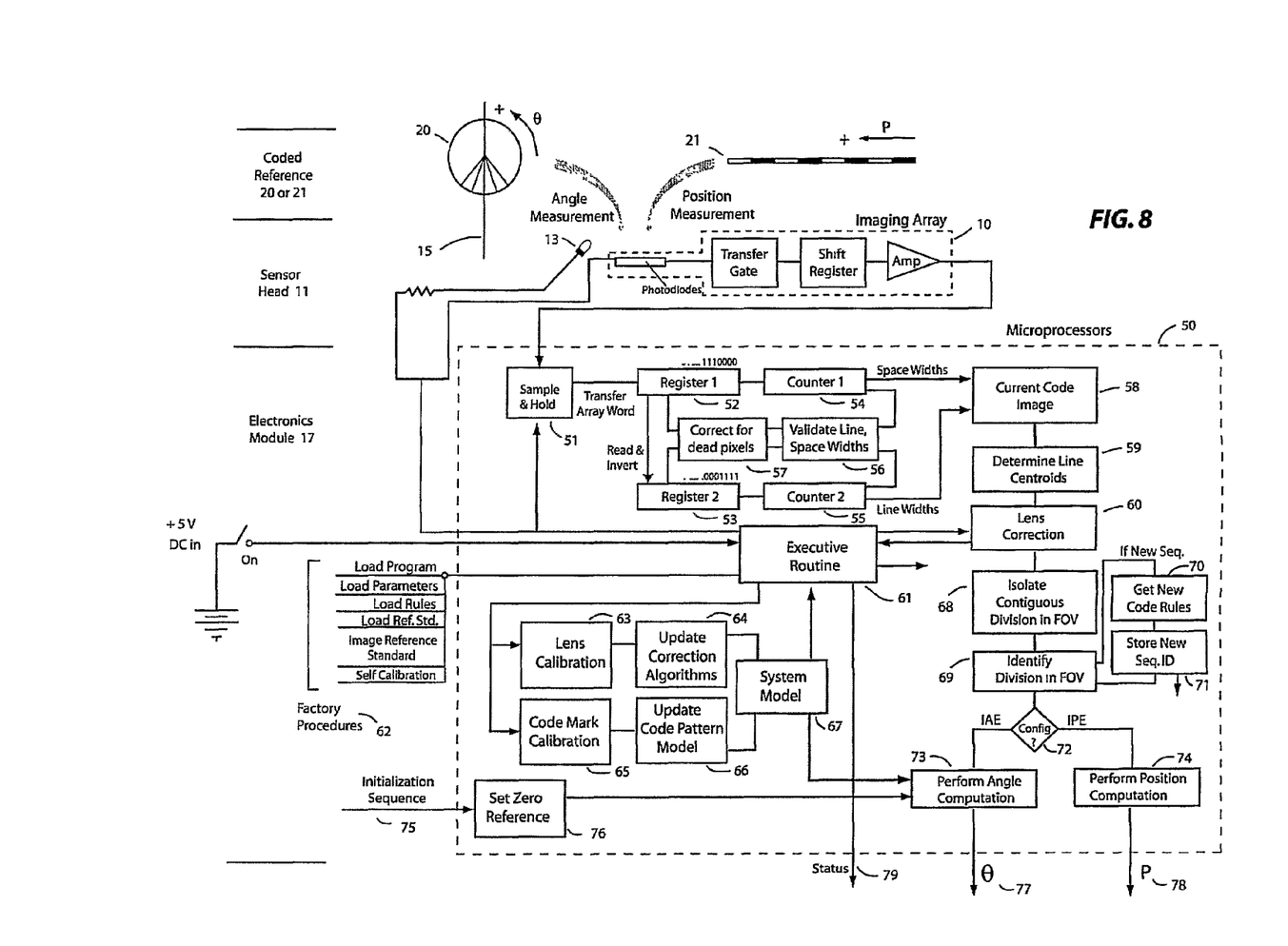
FIG. 8 is a general functional block diagram of a Dual Angle and Position Imaging Encoder using the method of the present invention.

FIG. 8 shows a general functional block diagram of the individual software modules comprising the micro-processor code 50 residing within the electronics module 17. General details of the logical processes and data manipulations performed within this code 50 are presented in the accompanying logical flow diagram provided in FIGS. 9 and 10. In the following discussion references 50-78 apply to FIG. 8 and references 90-121 to FIGS. 9 and 10. The software code 50 has the capability to perform angle or position computation without modification. The electronics module 17 is intended to be interchangeable for these two basic modes of operation. The micro-processor readable instructions 50 require minimal user action, limited generally to turn on, mode selection, output format selection, and zero reset. Setup and system calibration are achieved through automated factory procedures 62, 90-94 and internal self calibration 63-67, 117-119 software.

Figure 9:
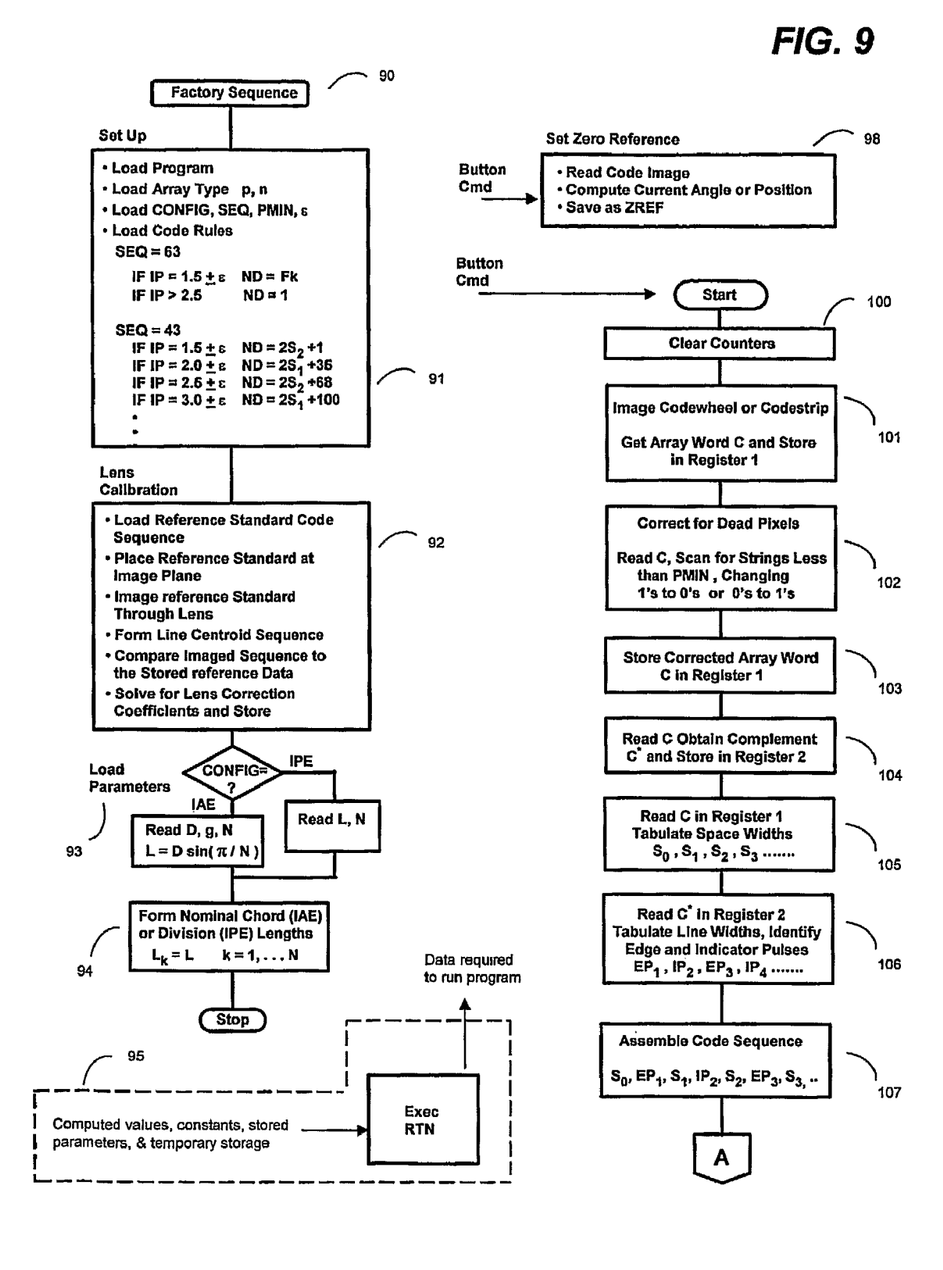
FIGS. 9 and 10 presents a general logic flow diagram of the microprocessor or computer readable instructions used by the present invention to accomplish angle determination, position determination, and code sequence calibration.

The system is initialized at the factory 62 by providing system model parameters 67, 93 specified by or derived from a series of inputs consisting of; the linear imaging array parameters, a description of the code sequence and set of interpretation rules 91, a precise description of the calibration standard, and a procedure 60-64, 92 for developing coefficients of the lens correction algorithm.

The linear imaging array parameters p, and n are specified by the manufacturer. Their product may if required be further calibrated by interferometric methods to a very high degree of accuracy. The value of array pitch p thus derived in this one time procedure would be valid for all arrays subsequently manufactured using the same array 10 printing masks.

Insertion 93 of nominal values D, N or L, N for angle or linear measurements, respectively, permit formation 94 of nominal chord or division lengths to be used prior to internal calibration procedures. If a capability to compute angular rate is desired, it will also be necessary to read in the gap g between the coded reference scale 25 and the effective image plane.

Division recognition is achieved in accordance with preprogrammed rules 91 associated with the specific sequence number coded into the first division. Rules for identifying the division number ND using one such coding scheme is provided in the SEQ. 43 block of FIG. 9. As is readily apparent, the rule is a simple function of the width of the indicator pulse and one of the two adjacent spaces within the division. The logic also includes a test 70, 113 to be able to recognize use of a new code sequence. If the test is positive, the logic retrieves the set of decoding rules for the new series, and retains the prior code sequence identifier in the event of reverse motion.

The factory calibration procedure 62-64 corrects for deviations in lens manufacture from design specifications, as well as other alignment and dimensioning errors in fabricating and assembling the encoder sensor head 11. This process requires a precision reference standard whose markings have been precisely calibrated. The standard is placed at the nominal object plane, and is imaged by the encoder. Polynomial coefficients necessary to transform the acquired reference image to an error free reading are computed, and these coefficients are used to overwrite 64, 92 the nominal coefficient values initially inserted.

Figure 10:
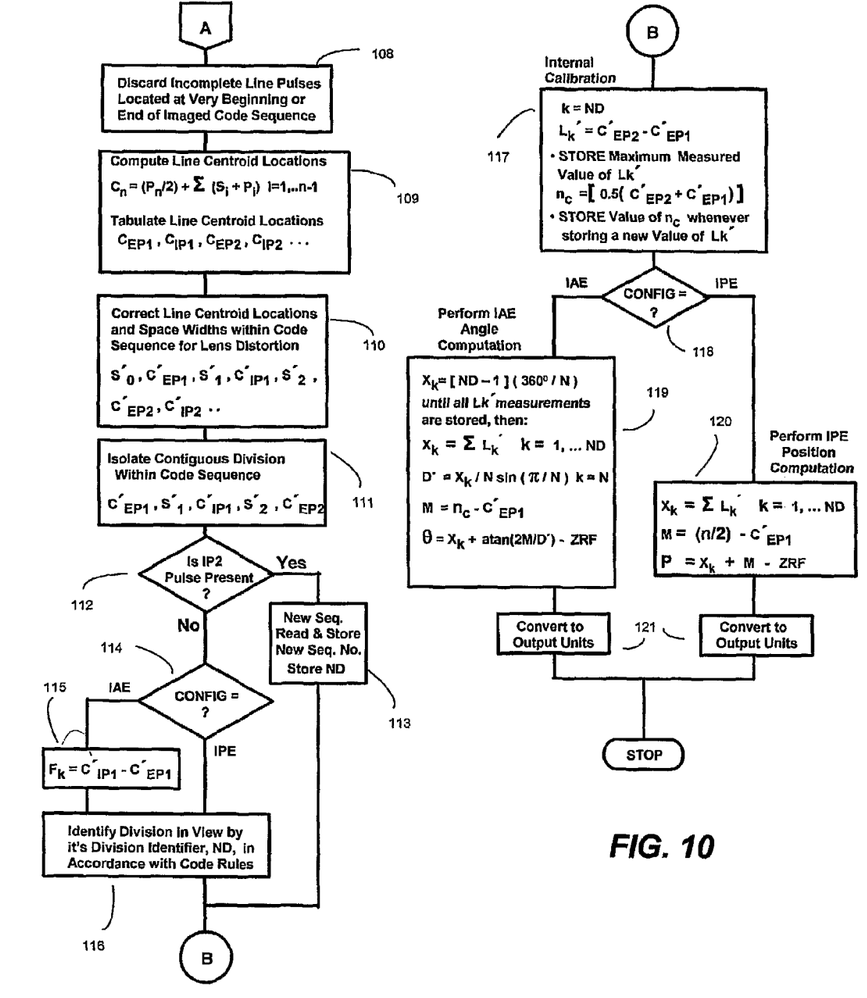

A second calibration process using internal software procedures 65, 117-119 corrects for reference scale 25 coding inaccuracies. Individual edge marks are imaged and their positions corrected for lens distortion 60, 110. Separation between consecutive edge mark centroids defines the size of each division measured in number of pixels, enabling the reference scale 25 to be updated in accordance with;

$$L'_k = C'_{EP2} - C'_{EP1} \qquad (5)$$

System model values 67 are updated as the calibration procedure proceeds and are made available through the executive routine 61, 95 which distributes parameter values as needed to the individual software modules.

Figure 3:
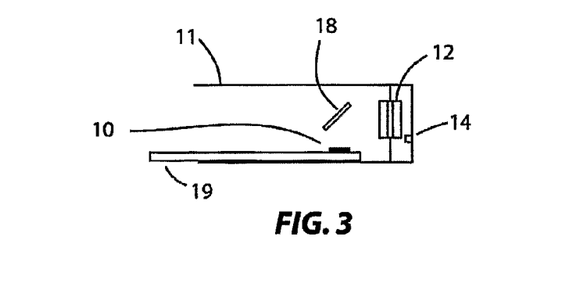
FIG. 3 is a cross sectional view of the sensor head showing an alternate embodiment of the encoder with the linear array lying in the plane of the microcircuit.

Photodiode arrays typically include an internal register providing a high speed serialized output stream to be sampled at the intended measurement rate. At a lower level, each photodetector responds to the number of photons received in the sampling cycle. These analog intensity measurements are amplified and thresholded to eliminate effects of light variation and noise. Once the analog signals are converted to digital form they are transmitted in packets to be assembled into an array word. Black markings on the code wheel translate into a string of 0's out of the linear array and the white background of the code wheel reflects as a string of 1's. Reading the linear array from right to left is equivalent to reading the image of the code wheel from left to right due to the image inversion produced by the lens 12, as shown in FIG. 3.

Referring back to FIG. 8, Register 1 (52) contains a series of 1's and 0's, where the 1's correspond to the higher intensity level reflected from the spaces between dark lines on the code wheel. Register 1 (52) is read in an operation where all of the 1's and 0's are reversed, thereby generating the compliment of the array word which is then stored in register 2 (53). The string of 1's in this second register corresponds to the image of the code lines on the coded reference 25. If the contents of each register are read by separate counters 54, 55 an exact measure of the width of each successive code line and intervening space, in number of pixels, can be tabulated. Each register is read from right to left to obtain string counts of the contents. If a 1 is encountered, a pulse width counter is incremented and the next pixel is read. The process continues until a 0 is encountered, at which time the current string count is frozen and stored. Register reading continues until the next 1 is encountered and a new string count is accumulated. At the conclusion of the process, Space Width Counter 1 having read Register 1 (54) will contain the intervals, measured in number of pixels, between successive imaged lines on the code wheel. Similarly, Line Width Counter 2 (55) having operated on Register 2 will contain the widths in number of pixels of the imaged lines on the code wheel.

Both space and line widths are then checked 56 for the appearance of up to PMIN adjacent pixel values that appear opposite to what they should be in an otherwise continuous string. With PMIN set to 3 or 4 pixels, such short pulse strings are well below the minimum string length corresponding to a given code wheel pattern, and indicate the presence of dead or inactive pixels. Invalid pulse strings can then be corrected 57, 102 in their respective registers prior to assembly 58, 107 of the current code image obtained by combining successive line and space widths. This process for identifying dead pixels each reading may be supplemented by an automated factory procedure that is separately required to determine acceptance of the microcircuit chip on which the linear photodiode array is created. The array is alternately exposed to all white and all black fields, with readings compared to identify inactive pixels. Array acceptance is made in accordance with predefined requirements that may preclude adjacent inactive pixels. Anomalies for accepted arrays are noted and stored within the internal test logic 56 such that inactive pixels do not cause an end or beginning of a string. Alternate embodiments to compensate for the effect of inactive detector elements include the use of multiple stacked linear arrays, registered with respect to one another, with a voting scheme employed to obtain the appropriate binary value amongst several inline array elements.

Having acquired a validated image, it is preferable to perform subsequent operations using the centroid location of the individual code markings, rather than their line widths in order to eliminate the inaccuracies associated with errors in the width and crispness of individual code markings. This process 59, 109 is done by successively summing space and pulse widths relative to pixel 1 in the imaging array 10 in accordance width:

$$C_n = \left(\frac{1}{2}\right) P_n + \sum_{i=1}^{i-1} [S_i + P_i] \quad (6)$$

where $S_i$ and $P_i$ are the ith space width and line width values contained in the space width and line width counters, 54, 56, respectively. The imaged code is next corrected for lens distortion 60, 110 prior to further processing.

A complete array word may contain up to six individual pulses, corresponding to three division edge marks and two or three division indicators, with edge and indicator lines distinguished by their width. This image sequence is of the form: $S'_0, C'_{EP1}, S'_1, C'_{IP1}, S'_2, C'_{EP2}, C'_{IP2}, \ldots$, where S' and C'are space widths and line centroids corrected for lens distortion. The sequence is analyzed 68, 111 to isolate a contiguous sector defined by consecutive edge marks, straddling a single indicator pulse. Sector 1 is an exception, in which its two edge marks surround two indicator pulses. Once an identifiable sector is recognized 69, 113, 116 using the quantity F in FIG. 7 and the rules provided 91 for the current sequence number, its position relative to the center of the array word is computed, and it is then possible to compute the angle 77, 119 or position 78, 120 output value.

The primary use of the imaging encoder is that of a static absolute angle or position displacement measurement device. The imaging encoder can be modified with the addition of a timing reference to provide a limited rate measurement capability. The range and accuracy of rate measurement will be a function primarily of the pixel response rate or the time it takes to collect sufficient photons to obtain a usable image. Additional speed related factors including code wheel diameter, array line rate, clock accuracy, microprocessor speed, and the size of the relevant software code also affect rate capability. Rate determination degrades when the recorded image of the coded reference marks 25 begin to smear across the detector array. This process starts when the reflected image of the leading edge of an observed reference line moves in position a distance equal to one pixel width during the array collection time.

The invention and methods presented herein provide for precise determination of angle or position in a single device. Such devices have wide application in complex electromechanical systems used in manufacturing, robotics, and process control, as well as in common instruments for measurement and display. The encoders unique ability to compensate for internal component and assembly defects, using the intrinsic high resolution of the linear array, provides a valuable potential cost advantage over current state-of-the-art encoders within the same accuracy class. Most significant however is the imaging encoder's potential for producing small absolute rotary and linear encoders, by leveraging state-of-the-art capabilities in microlithography to print the fine line code sequences needed and to fabricate the thin film semiconductor array necessary to read such code. Using these capabilities and the methods disclosed herein, it is envisioned that rotary encoders having a code wheel diameter in the range 0.25-0.50 inch, or less, can be easily achieved. This is well below the 0.75-1.0 inch limit of present day encoders. Commensurate reduction in the size of absolute linear position encoders is similarly anticipated.

The subject invention is an ideal candidate for use in robotic manipulators, where encoders typically account for as much as 30% of total system cost. Imaging encoders reading code sequences imprinted on the pivot shafts at multiple joints, with their slender profiles integrated into adjoining structural members, can contribute significant savings to overall robotic system cost and weight. Additionally, removing bulk from articulating joints can be critical to improving dexterity of end-effector elements, or minimizing overall size for medical or other such special purpose applications. Similar advantages apply to a wide variety of electromechanical systems that are found in machinery, vehicles, and a host of other industrial and commercial products that demand higher levels of miniaturization to meet stringent size, weight, and volume constraints.

Figure 11:
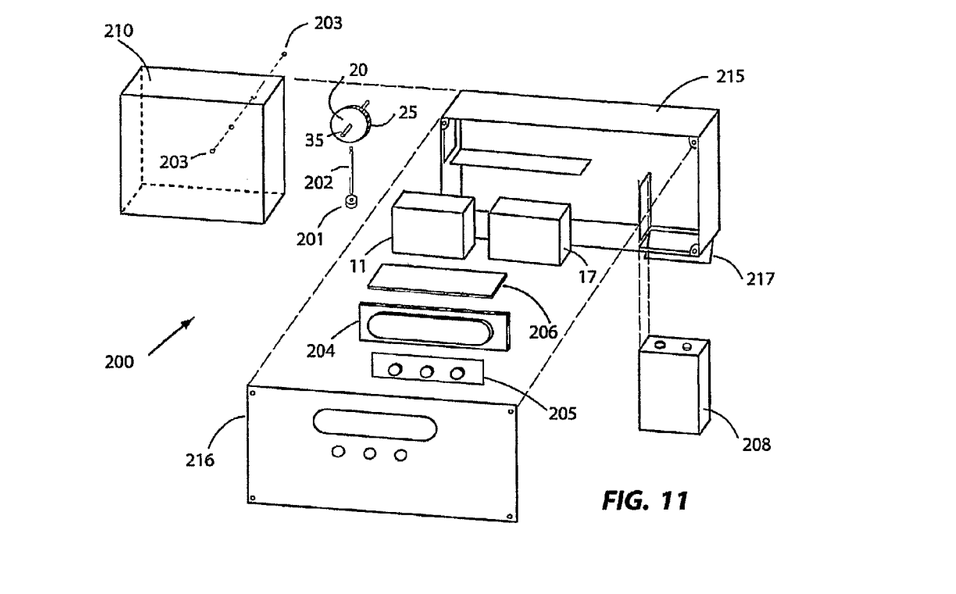
Figure 12:
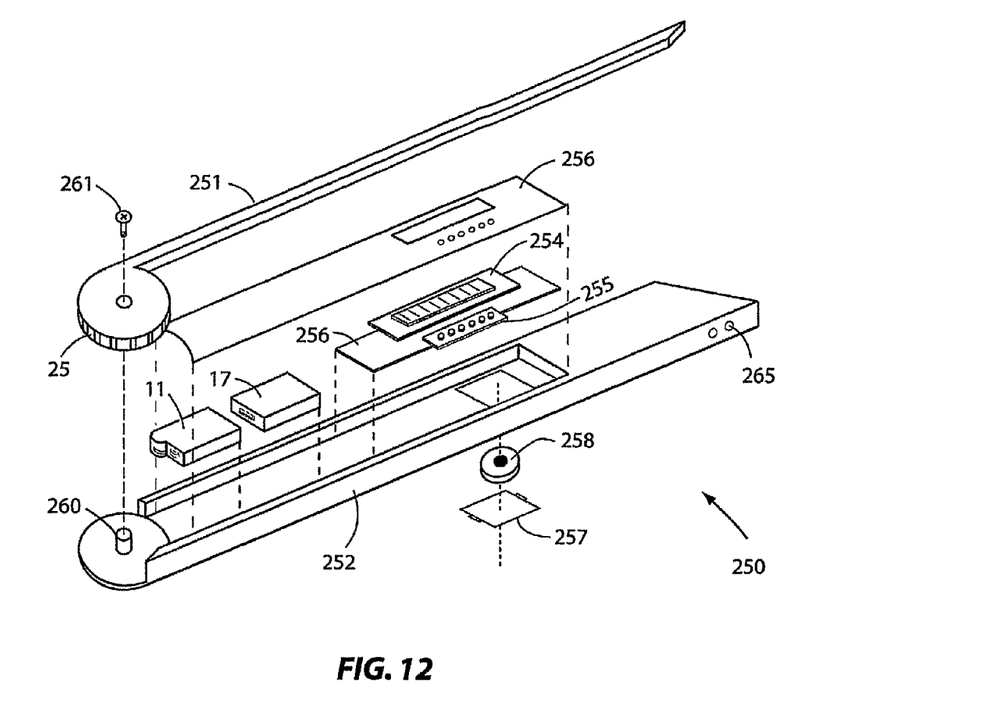
Figures 13, 13A:
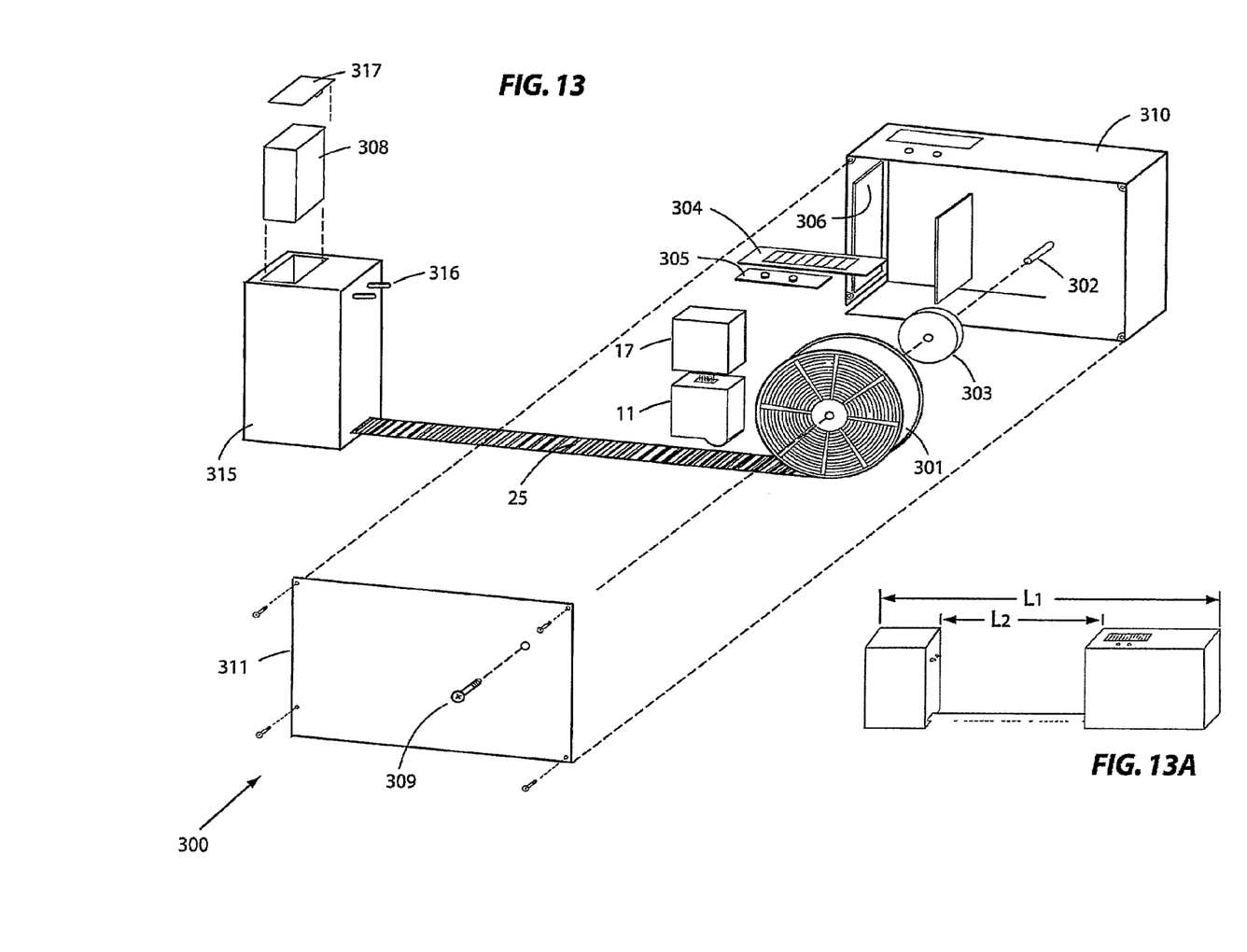

Apart from the potential to provide a compact, cost-effective solution for traditional optical encoder applications, the dual function imaging encoder described herein has extensive utility in a variety of instruments, meters, and tools—three examples of which are provided in FIGS. 11-13.

Figure 11A:
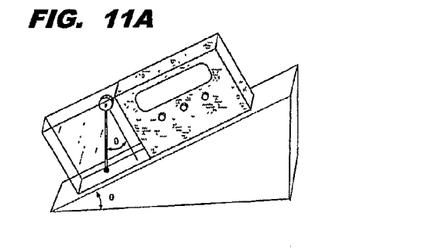
FIGS. 11A, 11B, and 11C illustrate different orientations of the apparatus to measure inclination, verticality, and level, respectively.
Figure 11B:
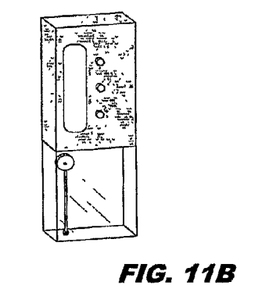
Figure 11C:
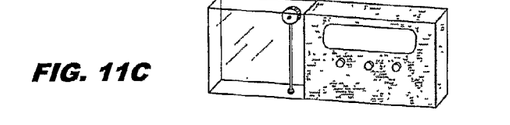

FIG. 11 is an exploded view of an angle measurement apparatus that combines the invention with a digital readout 204 to produce one embodiment of a device 200 that functions as an electronic clinometer. The apparatus includes a code wheel 20 to which is attached a small test mass 201 by a pendulum rod 202. Wheel enclosure 210 is sized to permit the code wheel to rotate freely on shaft 35 suspended in jewel pivots 203. The pendulum position acting under gravity is observed by reading the code sequence 25 imprinted on the edge of the wheel. The sensor head 11 and electronics module 17 as previously described are appropriately positioned in the housing 215 for this purpose, Power is provided by a small battery cell 208 inserted into the housing 215 through access door 217. The digital display 204 and control button set 205 are accessed through the front cover plate 216 and are tied to the device specific interface electronics 206 that also connects to the encoder electronics. Buttons provide on/off, decimal resolution, and zero set selections. Zero calibration may be done at the factory or by the user. Thereafter the apparatus is capable of: reading incline (FIG. 11A), verifying level (FIG. 11B), or determining the plumb (FIG. 11C) of a surface, depending upon how it is oriented.

Figure 12A:
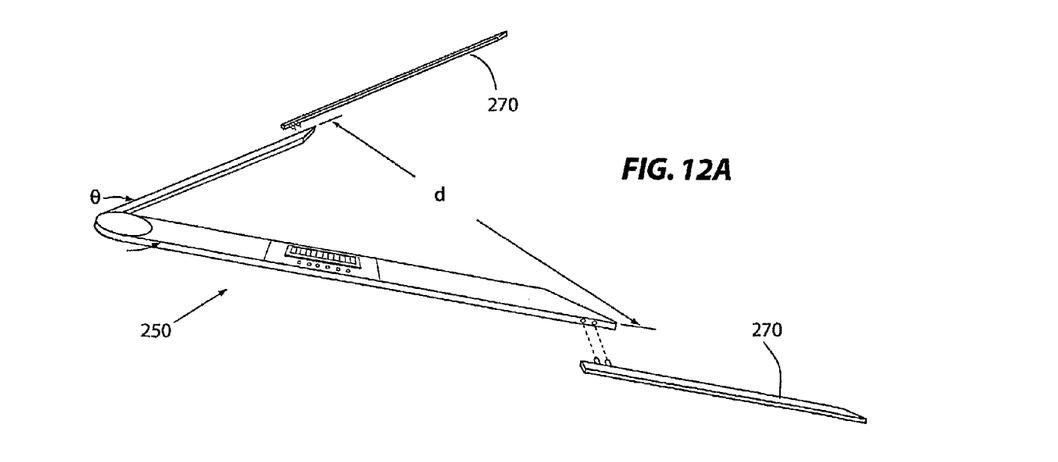
FIG. 12A illustrates the assembled apparatus with optional arm extenders to increase the linear measurement range.

FIG. 12 is an exploded view of an angle measurement device 250, incorporating the subject invention, configured to function as an electronic protractor and dimensioning instrument. The apparatus comprises a movable arm 251 integrated into an encoded wheel segment that attaches to a larger arm or base 252. The base houses the encoder elements 11 and 17, digital display 254, control button set 255, and battery 258, along with an interface board 256 for electrical integration. The arm is attached to the base over an internally threaded bushing 260 and held in place by screw 261 so as to allow friction controlled rotational motion. The base aligns the sensor head 11 for optimal viewing, encases all of the critical electrical components, and allows for insertion and removal of the cell 258 via a special access door 257. The display 254 and control buttons 255 are accessible through the cover plate 256. The apparatus 250 provides a precise measure of the included angle between the arm 251 and the base 252. Having knowledge of the included angle θ and the geometry to the extreme points, as seen in FIG. 12A, one can solve the triangle for the length d. Clip on extensions 270 extend the range of measurement, with the change in size of the working triangle sensed internally at the attach points 265. The apparatus is useful for accurate measurement, dissection, or multiplication of angles and interior lengths, as well as for performing area measurements, scaling drawings, or modeling. Button options provide on/off control, mode and unit selection, and zero reference adjust.

FIG. 13 contains an exploded view of one embodiment of an electronic tape measure 300 incorporating the present invention along with a display 304 to provide precise digital readout of the distance between two selected points. The apparatus is comprised of a reel of flexible tape 301 imprinted with a specialized code sequence 25 that is viewed by an imaging encoder 11 and 17 as previously described. The encoder is positioned in a housing 310 so as to read the coded tape 301 as it spools out. The wound tape 301, along with a spring loaded rewind mechanism 303, slips over an internally threaded shaft 302 and is held in place by a screw 309 passing through the cover plate 311. The housing 310 also contains the display 304, control button set 305, and interface card 306 specific to the tape measure apparatus 300. A separate housing 315 affixed to the free end of the tape contains a battery cell 308 that is removable for recharge or replacement through access door 317. Since the battery 308 is separated from the primary electrical components during measurement, it must charge a smaller cell located on the interface card 306 through contacts 316 when the two ends are brought together. The user selects measurement output units and format through the control buttons 305, which also provide on/off, interior/exterior measurement, division, multiplication, and zero set point selections. The electronic tape measure 300 employs an open ended coding sequence such as code sequence 43 for which interpretation rules were provided in FIG. 9, block 91. This sequence, of the form defined in FIG. 4, increments position and width of the interior indicator pulse in half integer steps within a division 20 units in length, yielding as many as 565 unique code segments before a new sequence is required. Using an array pitch p=14 µm, common array strings of 512, 1024, and 2048 pixels permit tape lengths of 12, 25, and 50 feet, respectively, to be accommodated. Using control button options, the user may select interior L1 or exterior L2 measurements, as indicated in FIG. 13A. Position determinations are absolute and insensitive to length being measured, both highly desirable features one would want in an electronic tape measure.

The preceding three examples illustrate how the invention described herein can be used to enable practical hand held instruments and tools. Other encoder technologies can be used to implement such products with the same functionality, and indeed some of these solutions have been brought to market. However, it is believed that the present invention by virtue of its size, slender profile, accuracy, cost and absolute determination feature enables attractive compact versions of these products with superior performance at substantially more affordable prices.

Although the invention has been described and illustrated with particularity, it is intended to be illustrative of preferred embodiments, and it is understood that there is no intent to be limited to these embodiments. On the contrary, the aim is to cover all modifications, alternatives and equivalents falling within the spirit and scope of the invention as defined by the claims. It is also understood that the disclosure has been made by way of example only. Numerous changes and the combination and arrangement of parts, steps, and features can be made by those skilled in the art without departing from the spirit and scope of the invention, as herein after claimed.

What is claimed is:

1. An apparatus comprising:
a sensor head wherein the detector consists of a linear imaging array and including an illumination source that illuminates a reference surface including a coded sequence of reference markings, and a detector that generates an output indicative of the coded sequence of reference markings from light reflected from the reference surface, wherein the reference surface comprises a cylindrical edge surface or a linear strip surface, wherein the cylindrical edge surface is located on a code wheel or rotor of an object whose shaft angle position or motion is to be measured, or wherein the linear strip surface is located on a planar surface of an object wherein linear position or relative motion with respect to said object is to be measured; and
an electronics module coupled to receive the output from the sensor head, indicative of the coded sequence of reference markings;
wherein the electronics module processes the received signal to determine a width and a centroid location of individual reference markings in the coded sequence of reference markings, and derives angle or position information based on the widths and centroid locations of the individual reference markings, and corrects for misalignment, lens distortion, and other errors, using the linear imaging array's known or measured properties combined with readings of an external calibrated reference standard, and calibrates the position of individual code markings reproduced on the coded reference to compensate for errors in code production.

2. An apparatus as claimed in claim 1, wherein the coded sequence of reference markings comprises: a sequence of rectangular code marks or lines of precise equal widths and spaced at regular intervals, thereby defining the start and end of each unit division of the code; two or more interior code marks or lines, with widths unequal and different from that used to mark the start and end of a unit division, whereby said interior lines define the start and direction of a particular code sequence with specific rules for interpretation; and a single interior code mark or line contained within a unit division, of separate and defined width whose position within the division is unique and sufficient to distinguish that division from all others in a specified code sequence, and wherein the spacing of division edge marks of a unit division is less than or equal to one-half of the length of the active portion of the imaging array.

3. An angle measurement device containing the apparatus defined in claim 2 and comprising:
- a pendulous mass suspended from a freely rotating code wheel;
- an angle encoder that generates angle information; and
- display means for displaying the angle information.

4. An angle measurement device containing the apparatus defined in claim 2 and comprising:
- two arms joined at one end and constrained to move with respect to one another about a single axis;
- a code wheel segment fixed to one arm;
- an angle encoder apparatus attached to the second arm that determines a measured angle; and
- display means for displaying the measured angle included between the arms or computed dimensions based upon the separation of the opposite end points of said arms.

5. A linear position measurement device containing the apparatus defined in claim 2 and comprising:
- a spool of flexible tape including a reference surface;
- an encoder apparatus that determines a measured value which is a function of the length of the tape that is drawn from the spool; and
- display means for displaying the measured value.

* * * * *